United States Patent [19]
Junker

[11] 3,765,688
[45] Oct. 16, 1973

[54] HIGH SPEED SHAFT CENTRIFUGE FLUID SEAL

[75] Inventor: Arnold E. Junker, Bridgeport, Conn.

[73] Assignee: Avco Corporation, Stratford, Conn.

[22] Filed: July 19, 1971

[21] Appl. No.: 163,725

[52] U.S. Cl................ 277/14, 277/DIG. 1, 277/67
[51] Int. Cl............................................. F16j 15/62
[58] Field of Search................. 277/14 R, 14 V, 13, 277/133, DIG. 1, 67

[56] References Cited
UNITED STATES PATENTS
| | | | |
|---|---|---|---|
| 2,665,929 | 1/1954 | Sawyer | 277/70 X |
| 1,895,288 | 1/1933 | Larsh | 277/133 X |
| 822,802 | 6/1906 | Wilkinson | 277/14 |

FOREIGN PATENTS OR APPLICATIONS
| | | | |
|---|---|---|---|
| 656,713 | 8/1951 | Great Britain | 277/13 |
| 970,408 | 9/1958 | Germany | 277/14 |
| 27,076 | 2/1964 | Germany | 277/14 |

Primary Examiner—Samuel B. Rothberg
Attorney—Charles M. Hogan et al.

[57] ABSTRACT

A U-shaped annular housing having a plurality of impeller vanes is fixed to a rotating shaft. A fixed radial baffle extends into the housing between the vanes and sealing is accomplished by centrifuging a fluid between the impellers and the baffle. Cool sealing fluid is continuously admitted to the housing in a radial jet stream and is exhausted by means of a plurality of bleed holes.

3 Claims, 1 Drawing Figure

Patented Oct. 16, 1973 3,765,688
AIR SIDE  OIL SIDE
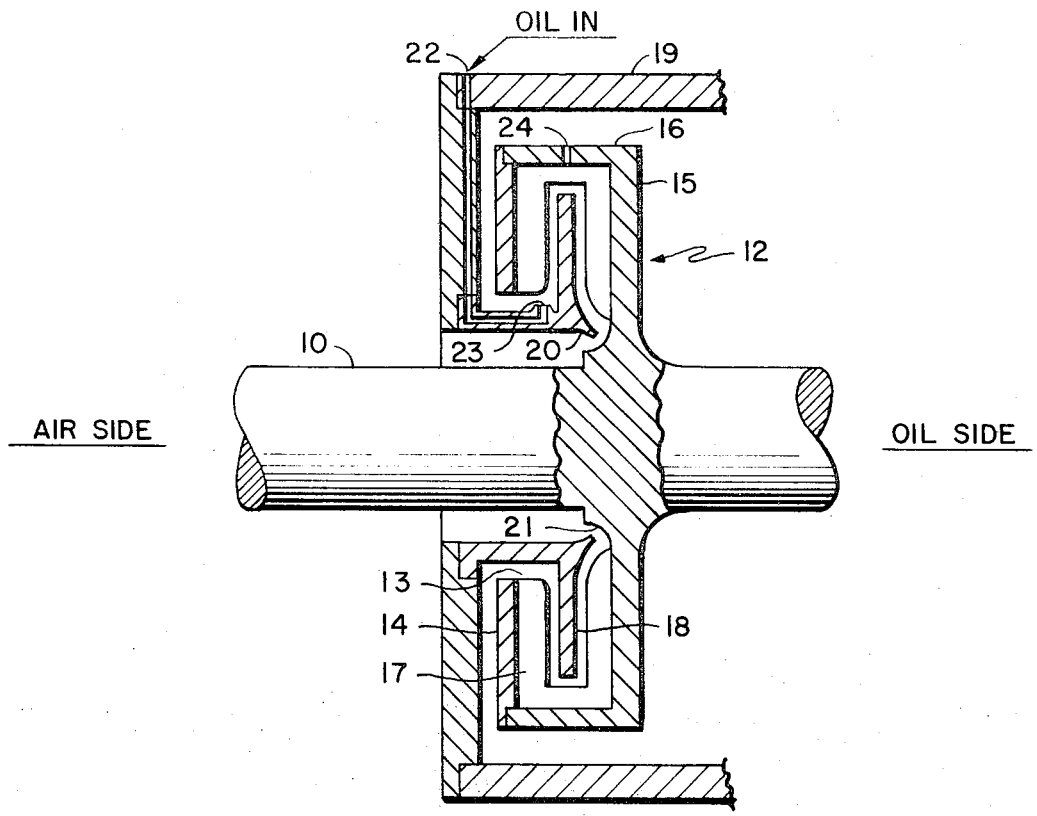
INVENTOR.
ARNOLD JUNKER
BY Charles M. Hogan
Irwin P. Garfinkle
ATTORNEYS.

HIGH SPEED SHAFT CENTRIFUGE FLUID SEAL

BACKGROUND OF THE INVENTION

The prior art, including the U.S. Pat. to Sawyer, No. 2,665,929, shows many fluid seals for rotating shafts. In the Sawyer patent, a shaft seal includes a rotating open channel containing a fluid. The channel is fixed to a rotating shaft, and the rotation of the shaft establishes the centrifugal forces which maintain the fluid within the housing. A flat annular stationary member extends radially into the housing and provides the sealing surface against which the centrifuged fluids act.

The present invention improves the known prior art by providing an annular housing with a plurality of impellers, and by continuously supplying inwardly directed radial jets of fluid to the housing, and by permitting the continuous escape of the fluid from the housing through a plurality of bleed holes. The continuous supply of sealing fluid through the stationary jets insures cool oil for the seal at all times and avoids deterioration of the oil due to excessive heat and centrifuging. The arrangement is such that any excess of oil will overflow into the oil side of the seal. The use of impellers increases the efficiency of the seal

OBJECTS OF THE INVENTION

It is an object of this invention to provide a fluid seal in which a continuous supply of cool oil is delivered to the seal.

Another object of his invention is to provide a fluid seal between relatively rotating parts, said seal comprising a rotating radial inwardly open channel containing a fluid, and a stationary annular plate positioned within the channel and in which a source of fluid is supplied continuously to the channel from stationary radial outwardly directed jets.

Still another object of the invention is to provide said channel with a plurality of impellers for increasing the centrifugal forces on the fluid.

THE DRAWING

The single FIGURE of the drawing shows an illustrative embodiment of this invention.

DESCRIPTION OF THE ILLUSTRATED EMBODIMENT

The sealing element constructed in accordance with this invention provides a seal between the air located on one side of a shaft 10 and the oil located on the other side. The seal comprises a U-shaped channel member 12 having a radially inwardly directed opening 13, side walls 14 and 15 and a base 16. The side wall 15 is fixed to the shaft 10 so that the channel member 12 is rotatable with the shaft. A plurality of U-shaped impeller vanes 17 is radially mounted within the channel member 12. An annular baffle on disk 18 projects into the channel member 12 and is fixedly supported from a housing or other stationary supporting structure 19. The baffle 18 is provided with an extension or lip 20 which overlaps an arcuate rim 21 at the junction of side wall 15 and the shaft 10.

Oil supplied from a source (not shown) is delivered through a passage 22 to radially outwardly directed nozzles 23 from which it is sprayed into the channel member 12. The channel member 12 is provided with a plurality of bleed holes 24 through which the oil in the channel is free to escape at a rate determined by the size of the bleed holes and the speed of rotation of the shaft.

As the shaft 10 rotates, the channel member 12 rotates with it and the vanes 17 impart a centrifugal force to the fluid contained therein. The pressure developed by the centrifugal forces simultaneously prevents the escape of oil and the admission of air. In the event that oil drips from the interior channel member 12 towards the shaft 10, it is deflected by the lip 20 onto the arcuate rim 21 where it is again centrifuged radially outwardly and back into the channel, thereby effectively preventing leakage. The amount of oil supplied through the port 22 to the channel member 12 may be programmed in accordance with shaft speed or it may be delivered at a fixed rate. In the event that too much oil is supplied, the excess oil will simply be spilled off into the oil side of the shaft and will not mix with the air.

The number and size of bleed holes 24 is dependent on the amount of oil supplied to the channel member 12 and the arrangement provides for the supply of cool oil to the seal at all times. In addition, it eliminates the deterioration of the oil caused by the centrifugal action and by the agitation of the baffle 18.

I claim:

1. A shaft seal comprising:
   a rotatable shaft;
   a U-shaped channel member having first and second axially spaced side walls and a base, said first wall being affixed to said shaft for rotation therewith and having an arcuate rim, the opening to said channel member being directed radially inwardly;
   stationary support structure;
   an annular baffle in the form of a disc affixed to said stationary support structure and radially projecting into said channel member through said opening, said disc having a lip overlapping and extending toward said rim whereby sealing fluid dripping from said baffle is deflected by said lip onto said rim and is centrifuged by said rim into said channel member;
   means for continuously supplying sealing fluid to said channel member during rotation of said shaft; and
   at least one bleed port formed in the base of said channel member for continuously bleeding sealing fluid radially outward from said channel member.

2. The invention as defined in claim 1 further comprising radial impellers secured to said side walls.

3. The invention as defined in claim 1 wherein said fluid is supplied to said channel member in a radially directed jet.

* * * * *